(12) United States Patent
Adelman et al.

(10) Patent No.: US 10,270,705 B1
(45) Date of Patent: Apr. 23, 2019

(54) TRANSMISSION OF STATEFUL DATA OVER A STATELESS COMMUNICATIONS CHANNEL

(71) Applicant: VIOLIN MEMORY INC, Santa Clara, CA (US)

(72) Inventors: Maxim Adelman, New York, NY (US); Stephen Fischer, New York, NY (US)

(73) Assignee: VIOLIN SYSTEMS LLC, San Jose, CA (US)

( * ) Notice: Subject to any disclaimer, the term of this patent is extended or adjusted under 35 U.S.C. 154(b) by 0 days.

(21) Appl. No.: 14/570,495

(22) Filed: Dec. 15, 2014

Related U.S. Application Data (60) Provisional application No. 61/917,649, filed on Dec. 18, 2013.

(51) Int. Cl.
*H04L 12/823* (2013.01)
*H04L 12/863* (2013.01)

(52) U.S. Cl.
CPC .......... *H04L 47/6245* (2013.01); *H04L 47/32* (2013.01)

(58) Field of Classification Search
CPC ............................ H04L 47/6245; H04L 47/32
USPC ....................................................... 370/412
See application file for complete search history.

(56) References Cited

U.S. PATENT DOCUMENTS

| | | | | |
|---|---|---|---|---|
| 4,829,526 A * | 5/1989 | Clark | ...................... | G06T 9/005 714/751 |
| 6,621,799 B1 * | 9/2003 | Kemp | ................... | H04L 1/1809 370/236 |
| 6,665,811 B1 * | 12/2003 | de Azevedo | ............ | H04L 43/50 714/4.1 |
| 6,834,326 B1 * | 12/2004 | Wang | .................. | G06F 11/1076 370/355 |
| 6,990,535 B1 * | 1/2006 | Yang | ................... | G06F 13/4243 370/379 |
| 2003/0009717 A1 * | 1/2003 | Fukushima | ........... | H04L 1/1642 714/748 |
| 2003/0145134 A1 * | 7/2003 | Wehage | ................ | G06F 13/124 710/1 |
| 2003/0161391 A1 * | 8/2003 | Andre | ................... | G06F 13/385 375/219 |
| 2004/0078638 A1 * | 4/2004 | Cochran | ............. | G06F 11/1443 714/6.12 |
| 2004/0199276 A1 * | 10/2004 | Poon | ................ | G11B 20/10527 700/94 |
| 2005/0276221 A1 * | 12/2005 | Olesinski | ................ | H04L 47/10 370/235 |

(Continued)

*Primary Examiner* — Peter G Solinsky
(74) *Attorney, Agent, or Firm* — Schwabe Williamson & Wyatt (57) ABSTRACT

A system and method for transmitting stateful data over a highly reliable stateless communications channel between a master device and a slave device is provided. Data that has been transmitted from the master device to the slave device is maintained in a buffer at the master device until the slave devices completes the actions required by commands accompanying the data and reports successful completion of the actions. Should an error occur in the data or processing of the data at the slave device an error message is sent from the slave device to the master device causing the stored transmitted data that has not as yet been acknowledged to be retransmitted to the slave device.

11 Claims, 8 Drawing Sheets

(56) References Cited

U.S. PATENT DOCUMENTS

| | | | |
|---|---|---|---|
| 2006/0149850 A1* | 7/2006 | Bowman | G11B 27/10 709/231 |
| 2007/0011561 A1* | 1/2007 | Ambilkar | H03M 13/09 714/758 |
| 2008/0010340 A1* | 1/2008 | Orady | G06F 3/14 709/203 |
| 2008/0049754 A1* | 2/2008 | Kim | H04L 1/165 370/394 |
| 2008/0225873 A1* | 9/2008 | Rider | H04L 47/10 370/412 |
| 2008/0227442 A1* | 9/2008 | Pani | H04L 1/1877 455/422.1 |
| 2009/0003228 A1* | 1/2009 | Chen | H04L 43/0847 370/252 |
| 2009/0052326 A1* | 2/2009 | Bergamasco | H04L 47/10 370/236 |
| 2009/0158108 A1* | 6/2009 | Manning | G06F 11/1443 714/746 |
| 2009/0271680 A1* | 10/2009 | Tanigawa | H04L 1/08 714/748 |
| 2009/0310485 A1* | 12/2009 | Averi | H04L 45/00 370/232 |
| 2010/0107029 A1* | 4/2010 | Kikuchi | H04L 1/1607 714/748 |
| 2010/0214942 A1* | 8/2010 | Du | H04L 43/0876 370/252 |
| 2010/0226384 A1* | 9/2010 | Prabhakar | H04L 1/1883 370/412 |
| 2010/0262882 A1* | 10/2010 | Krishnamurthy | G06F 11/1443 714/748 |
| 2010/0296449 A1* | 11/2010 | Ishii | H04L 1/1874 370/328 |
| 2011/0019643 A1* | 1/2011 | Kim | H04W 36/02 370/331 |
| 2011/0069668 A1* | 3/2011 | Chion | H04L 1/1829 370/329 |
| 2011/0131385 A1* | 6/2011 | Henriksson | G06F 13/1642 711/158 |
| 2011/0161777 A1* | 6/2011 | Radulescu | H03M 13/091 714/758 |
| 2012/0143957 A1* | 6/2012 | Ganapathy | H04L 43/10 709/205 |
| 2012/0230186 A1* | 9/2012 | Lee | H04L 43/028 370/230 |
| 2013/0028121 A1* | 1/2013 | Rajapakse | H04L 65/4076 370/252 |
| 2013/0039405 A1* | 2/2013 | Goto | H03M 13/2957 375/229 |
| 2013/0050739 A1* | 2/2013 | Oshima | G06F 3/1234 358/1.14 |
| 2013/0083677 A1* | 4/2013 | Kim | H04W 72/1284 370/252 |
| 2013/0128897 A1* | 5/2013 | Tiernan | H04J 3/00 370/442 |
| 2013/0188648 A1* | 7/2013 | Nakatsugawa | H04L 47/30 370/394 |
| 2013/0229916 A1* | 9/2013 | Isobe | H04L 1/1854 370/230 |
| 2013/0262612 A1* | 10/2013 | Langas | G06F 3/0605 709/211 |
| 2014/0153460 A1* | 6/2014 | Shrivastava | H04W 52/0225 370/311 |
| 2014/0241249 A1* | 8/2014 | Sindhushayana | H04L 1/0003 370/328 |
| 2015/0078251 A1* | 3/2015 | Clevorn | H04L 1/16 370/328 |
| 2015/0106549 A1* | 4/2015 | Brown | G06F 3/065 711/103 |
| 2015/0249602 A1* | 9/2015 | Barner | H04L 45/72 370/389 |
| 2015/0341705 A1* | 11/2015 | Rauhe | H04L 69/163 725/116 |
| 2016/0182608 A1* | 6/2016 | Reider | H04L 1/1809 709/217 |
| 2016/0188224 A1* | 6/2016 | Yin | G06F 3/0613 711/154 |

\* cited by examiner

TRANSMISSION OF STATEFUL DATA OVER A STATELESS COMMUNICATIONS CHANNEL

This application claims the benefit of U.S. provisional application Ser. No. 61/917,649, filed on Dec. 18, 2013, which is incorporated herein by reference.

BACKGROUND

In a computer system, which may include associated digital data storage devices, communication between a processor or controller, for example, and other aspects of the computer system, e.g., cache memory, input/output devices, displays, internal memory, attached memory and networked memory, may be over a variety of bus structures having differing high- and low-level protocols. Some of the communications paths are intended to provide high-speed reliable transmission of data and commands between elements of the computer system (e.g., a memory controller and a memory device.)

Often a stateless communication channel is employed. Stateless (memory-less) protocol channels have end points with no protocol-defined way to remember where they are in a "conversation" of message exchanges. In such connectionless transmissions the sender usually cannot be guaranteed that there will be no loss of, for example, data, or error insertion, duplication, or out-of-sequence delivery of the message when received at the receiving end of the channel. These channels have, however, the advantage of efficiency and high throughput. Such protocols are used, for example, for the datagram packet mode of the Internet protocol (IP), where occasional loss of a message or packet is not catastrophic.

In a stateless connection, no information on the state of the communications channel is retained by either sender or receiver. The sender device transmits a message at a proximal end of the communications channel to a receiver device at a distal end of the communications channel and the sender device does not expect an acknowledgment of successful receipt of the message by the receiver device at the distal end. The receiver device, at the distal end, receives the message without any prior connection setup. Here, the term "message" may be understood to encompass digital information of all types, computer instructions operational commands, data to be stored or retrieved, status information, or the like. Where specific data types are meant, a person of skill in the art would understand the context. Often the term "data" or "information" may be used to represent the message itself.

Much of the operation of a computing system and its accoutrements depends on knowing the state of the data and on an exceedingly low instance of lost or otherwise corrupted data. Stateful data has the characteristic that one or more attributes of the data depends on the prior actions taken with respect to the data. For example, pages of data may be in an ordered sequence and a sequence of in-process commands being executed by a processor in a first state is stored in an ordered manner along with the computed results when the processor enters a second state, such that the sequence of in-process commands, the remaining data and the computed results is preserved for later execution when the first state is resumed. This is merely a broad example and should not be considered to limit the nature of the information which may be considered to be associated with a "state" or the type of data which may be considered "stateful."

While the state information may be passed as a parameter in the data being transmitted, the communications channel may nevertheless itself be stateless. A passed parameter may be an index, computed results, or the like. Even if the passed parameter is an "identifier" of the conversational state (e.g., an index, or a session Id) the communications protocol is still a stateless protocol, as the conversation between the sending and the receiving end of the channel is stateless. However, where such state information is passed between the sender and the receiver communications channel endpoints, the data at each of the end points of the communications channel may be stateful.

In computing systems, data transfer mechanisms over the communications channel are highly reliable and random errors are highly unusual. Data loss or error due to hardware faults, for example, can also occur. Where a data loss or error is encountered, the error is ordinarily corrected by an error correcting code (ECC) that was previously computed on the transmitted data and transmitted with the data so as to perform a check that the data being received is correct. Error correcting codes such as a cyclic redundancy code (CRC), BCH and others may be used, depending on the system design. Random errors have finite probabilities of occurring even in a well-designed system and the ECC is designed to detect and correct such errors. However, the ECC cannot detect or correct all errors, as the number of errors may exceed the correction capability of the ECC being used. So, errors may detectable and correctable, detectable and uncorrectable, or undetected, in order of decreasing probability of occurrence. Undetected errors result in the corruption of the data and such corruption is not apparent to the user, although the error may become apparent at some later time when the corrupted data is used. Errors that are detectable and correctable and repaired by the receiving end of a communications channel as a routine operation. Transmission of data by the sender may proceed uninterrupted.

Where an error is detected, but is uncorrectable, or if other parameters embedded in the data can be interpreted to indicate the loss of data, multiple transmissions of the same data, out of sequence reception of data, or the like, corrective action may need to be taken. Generally this corrective action would require the retransmission of the data, possibly the undoing of operations already taken by the receiving end of the communications channel, or the like. Such operations may present a significant disruption to a high-speed communications channel as there may be a plurality of data elements in transit, or being operated upon, or awaiting transmission.

SUMMARY

In an aspect, a transaction protocol for a communications channel in a computing system or portion thereof and device and method for performing the same is described, comprising a stateless communication channel over which stateful data may be transmitted. In an example, stateful data, such as commands to read or write data to a memory, and associated data payloads, may be maintained in a First-In-First-Out (FIFO) buffer in a device at a sending end of the communications channel, and a response to a command executed by the device at the receiving end of the communications channel, such as a memory device, may be read out of a FIFO of the results of executing the command at the memory device. The data that is read out is transmitted over the communications channel to the device that originally initiated the transaction. Such results may be a status of the operation requested, an error message with respect to the received data, computed data, or the like, or the results of the commanded operation, which may be data read from the memory of the memory device, results of a computation performed, or the like. An error occurring on the communications channel and detected at the receiving end of the channel may cause, for example, an automatic retry of transmission over the stateless channel.

Each transaction request (e.g., read or write command, or the like) received in an input FIFO buffer at the receiving end of the communications channel is executed by the device, which may be a memory system, server, or the like, at the receiving end of the communications channel and the results maintained in a output FIFO buffer of the receiving-end device, which may be read (for example, by polling) by the device at the transmitting end of the communications channel. Alternatively, the results in the output FIFO buffer may be transmitted from the receiving-end output FIFO buffer to the transmitting end device as such results become available. Since the reception of data at the receiving end causes operations to be performed by the device at the receiving end of the communications channel, and the reading of data from the output FIFO buffer of the receiving end causes operations to be performed at both the receiving and the transmitting end, the state at each of the transmitting end and receiving ends of the communications channel may generally have changed. Where there is a retransmission of data, loss of data, or the like, the correct states may not be successfully maintained.

In an aspect, a master device, such as a processor, may be configured to perform read and write transactions with one or more slave devices, such as a memory system, over a stateless communication channel. The master device may have a retry buffer for tracking each outstanding transaction in-flight from the master device to the slave device. The in-flight tracking may be maintained until such transactions have been successfully completed at the slave device and reported to the master device by the slave device. In the case of a channel error, master device may be configured to perform a retransmission of the retry buffer of in-flight transactions. The retry buffer may be maintained as a part of the output buffer of the master device or in a separate buffer.

A channel error (which may also include an error at the slave device) and subsequent transmission retries may cause at least some of the following problems, as examples:
  a slave device on the communications channel may lose a data transaction request (e.g., command, status), device status read, or read or computed data;
  a slave device on the communications channel path may receive a duplicate transaction request or status read, or the like;
  a slave device whose channel position is to orthogonal to the communications channel path may receive a duplicate transaction request or status read;
  a master device may lose a response from a slave device that is on the communications channel path;
  a master device may receive a duplicate response or a sequence of responses from a slave device on the communications channel path; and,
  a master device may receive a duplicate response or a sequence of responses from a slave device whose channel position is orthogonal to the communications path. (That is, for example, the master device may receive an unexpected data from a slave device for a transaction not initiated by the master device.)

In an example, the stateful data transmitted to the slave involves a master device configured to issue requests to the slave device, and reading or receiving responses associated with the requests from the slave devices. Several protective mechanisms may be employed to prevent the loss of state caused by retries, loss of data and the like.

Transaction requests initiated by the master device may be assigned an incrementing sequence number selected from a continuous monotonic integer set where the size of the set is larger than maximum number of entries in the communications channel retry (in-flight) buffer of the master device. The slave device may read the sequence number of each successive request received from the master device and discard received requests whose sequence numbers violate the incrementing requirement. Such action prevents double-insertion of requests into the receiving FIFO in case of a channel retry caused by either a forward or reverse channel error and prevents a non-consecutive insertion of requests into the receiving FIFO at slave device with intermittent channel drop outs or out-of-sequence transmission.

The results of performing operations requested of the slave device by the master device may be represented as status data, user data, computational results, or the like, which may include error reports. In an example, the data is read from the output FIFO buffer of the slave device by polling by the master device. The protocol may be such that only one poll transaction at a time is outstanding on the communications channel at any time. Alternatively, the status data may be transmitted from the slave device to the master device by a protocol similar to that described for transmitting data from the master device to the slave device.

An example of a polling mechanism may use two polling classes: state-neutral ("poll") and state-altering ("pop"), verifying that a first poll request has been successful prior to issuing the second poll request in an alternating sequence. A "poll" request returns the data value entry at the head of the output FIFO, with the data remaining in the output FIFO. A "pop" request removes the data value entry from the head of the FIFO. So, in the event of a failure of communications over the channel, the "poll" entry may be retried as the requests from the master do not alter state from "poll" to "pop" until after a successful data transfer has been completed. If the slave device does not have any data in the output queue, there may be no data transmitted in response to the "poll". As such, the poll is unsuccessful in returning data to the master device, and the state-neutral poll is repeated until a valid response has been received in response to the poll. One may say that the "poll" request process spins until there is data at the output FIFO of the slave to be retrieved by the master and that data is actually received by the master device.

The request for performing a "pop" operation is assigned an alternating identifier to that of a "poll" operation by the master device. The slave device monitors the sequence of identifiers and discards any requests that violate the alternating identifier requirement. This prevents the double-removal of responses from the slave output FIFO in case of a communications failure. That is, a pop operation is not sent by the master until a valid response to the previous poll operation is received from the slave. A pop transaction pops (removes the data from) the head of the FIFO queue. If the pop transition was unsuccessful a duplicate of the previously sent data will be sent and this can be identified by the master device. On the other hand, a pop request that is not immediately preceded by a poll request will not transmit new data. Routine operation consists of alternating pop and poll requests.

After successfully completing the "pop" request, a next data value to be retrieved is at the head of the output FIFO queue of the slave device and the next state neutral "poll" by the master causes this next data value to be transmitted to the master device. This approach ensures that the data value representing the state is received and suitably processed before a state-altering transaction is executed at the slave device.

In another aspect, a pair of transaction requests transmitted from the master device may encapsulate a block of data to be transmitted from the master device to the slave device, and a pair of response values may encapsulate a block of data or responses to be transmitted from the slave device to the master device.

The protocol may be used to transmit blocks of data to be written to the slave device or read from the slave device in what is conceptually a single operation, such as reading a plurality of contiguous logical pages, without having to process the protocol for each of the pages. This reduces the processing burden while maintaining the state, since the likelihood of an error on the channel is very small. Detection of an error would then result in retrying the entire encapsulated transaction.

DESCRIPTION

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

It will be appreciated that the methods described and the apparatus shown in the figures may be configured or embodied in machine-executable instructions, e.g. software, or in hardware, or in a combination of both. The machine-executable instructions can be used to cause a general-purpose computer, a special-purpose processor, such as a DSP or array processor, or the like, to act on the instructions to perform functions described herein. Alternatively, the operations might be performed by specific hardware components that may have hardwired logic or firmware instructions for performing the operations described, or by any combination of programmed computer components and custom hardware components, which may include analog circuits.

The methods may be provided, at least in part, as a computer program product that may include a non-transient machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions or data for execution by a computing machine or special-purpose hardware and that may cause the machine or special purpose hardware to perform any one of the methodologies or functions of the present invention. The term "machine-readable medium" shall accordingly be taken include, but not be limited to, solid-state memories, optical and magnetic disks, magnetic memories, and optical memories, as well as any equivalent device that may be developed for such purpose.

For example, but not by way of limitation, a machine readable medium may include read-only memory (ROM); random access memory (RAM) of all types (e.g., S-RAM, D-RAM. P-RAM); programmable read only memory (PROM); electronically alterable read only memory (EPROM); magnetic random access memory; magnetic disk storage media; flash memory, which may be NAND or NOR configured; memory resistors; or electrical, optical, acoustical data storage media or the like. A volatile memory device such as DRAM may be used to store the computer program product provided that the volatile memory device is part of a system having a power supply, and the power supply or a battery provides power to the memory device for the time period during which the computer program product is stored on the volatile memory device.

Furthermore, it is common in the art to speak of software, in one form or another (e.g., program, procedure, process, application, module, algorithm or logic), as taking an action or causing a result. Such expressions are merely a convenient way of saying that execution of the instructions of the software by a computer or equivalent device causes the processor of the computer or the equivalent device to perform an action or a produce a result, as is well known by persons skilled in the art.

The term "communications channel" is intended to be broadly interpreted as any wired or wireless mechanism for transferring messages from a sending device at a proximal end to a receiving device at a distal end. The devices at the distal and proximal ends may have the functions of sending and receiving interchanged, or they may perform both functions. So, when sending and receiving are described, each device may be a sender or a receiver as needed to perform the functions attributed to the device. The proximal or the distal end of the communications channel is the place along the communications channel where one of the devices is performing its function, and there may be a plurality of proximal ends and a plurality of distal ends to the communications channel, which may be a network, such as the Internet, a Wide Area Network, a computer bus, or the like.

A system and method for transmitting stateful data over a stateless communications channel is described. In an example, shown in FIG. 1, a master device 15 may be in communications with a slave device 10 over a communications channel 8. The master device 5 may be a processor or memory controller or channel interface and the slave device may be a memory system, channel interface or memory module 10 for storing or retrieving data in response to requests from a user system, which may be any other device providing or requesting data. The communications channel may be any type of conventional busses or communications channel that may be used in computing systems, or that may be developed to perform the same or similar functions.

Figure 1:
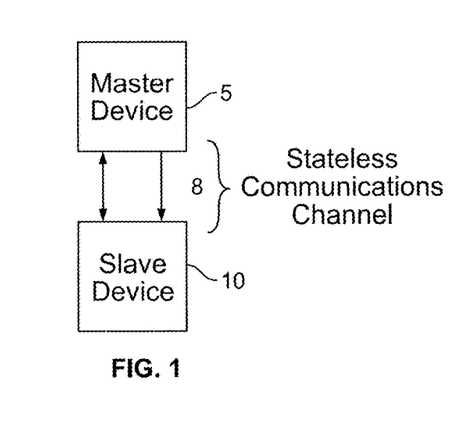
FIG. 1 is a block diagram showing an example of a master device communicating with a slave device over a stateless communications channel.

Only a single master device and a single slave device are shown, however a master device may serve as the master device for a plurality of slave devices, which may be in communications with the master device through, for example, a bus hierarchy which may be a linear bus or a tree, or any combination thereof. Moreover, the functions of master and slave may be interchanged in some embodiments depending on the function to be performed. The commands and data may be transmitted from a master to a slave by a point-to-point connection, or may be routed from the master to the slave over a network, in which case the commands and data may include a destination address, routing indicators, or the like. Where a forward path is discussed, a return communications would be understood to exist and be operable whenever bi-directional communications is needed.

Figures 2, 3B:
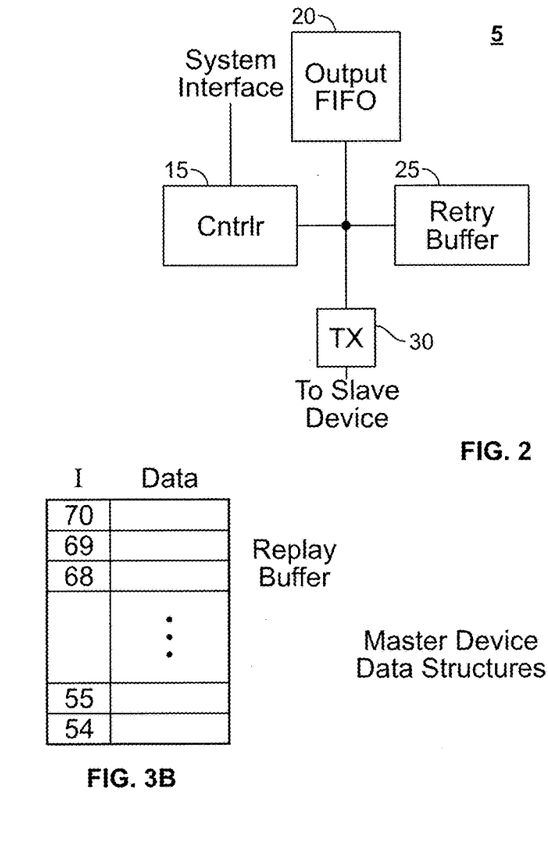
FIG. 2 shows a block diagram of a portion of the master device.
FIG. 3B shows an example of a data structure maintained in a replay buffer of the master device showing a sequence of previously transmitted data that has not as yet been responded to by the slave device.

FIG. 2 is a simplified block diagram of the master device 5. The master device 5 may comprise a controller 15 in communications with an slave device 10 through a system interface which may comprise a transmitting interface 30 and a receiving interface 35, capable of executing one of the communications protocols used for such purpose, or which may be developed for the purpose in the future. Local area networks, the Internet, PCIe protocols, other mesh connections or switched connections, busses and the like, may be used. The transmitting and receiving interfaces may perform such ancillary functions as performing error detection and correction, decoding addresses and the like.

The master device may have one or more memory components which may be partitioned into hardware or software defined memory spaces.

Functionally, such memory spaces may serve the infrastructure needs of the master device 5 as well as, for example, provide a master device output FIFO 20 and a retry buffer 25. The transmitting interface 30 with a communication channel may serve to execute low-level protocols to transfer data from the memory components to the stateless communication channel 8.

Figure 3A:
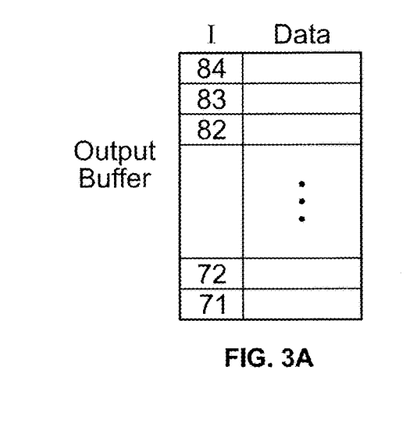
FIG. 3A shows an example of data structure maintained in an output buffer of the master device showing a sequence of data elements awaiting transmission to the slave device.

FIG. 3A shows a simplified data structure for the master device output FIFO 20 and FIG. 3B shows a simplified data structure for the replay data buffer 25. Each entry in the data structures of FIGS. 3A and B may be assigned a unique consecutive index selected, for example, from a continuous set of monotonically increasing integer values. (hereinafter called a "consecutive sequence number"). The number of values in the set is selected to be sufficiently large that all of the entries in the FIFO and replay buffers may be uniquely identified, and where the capacity of the buffers is sufficient to meet the system throughput and response time requirements. That is, the sequence may roll over or restart but the modulo of the sequence is sufficiently large that all of the actions that could be outstanding with respect to the stateful data are completed such that the consecutive sequence number remains unique with respect to the data element, command, or the like, that has been tagged with the sequence number while in the buffers.

The buffers may be organized as a FIFO, either literally or figuratively, depending on the specific design. In either case, there is a next data item to be processed, and this is referred to as being at the top of the buffer or the head of the queue. Each data item may be a command, such as read, write or report status, or a response such as read complete, write complete, data to be written or that has been read, or an error (various types may be specified). For convenience, the input, output buffers are described as FIFOs in the present example.

The replay buffer 25 differs in function. Data that has been transmitted from the master device 5 to the slave device 10 is retained in the replay buffer 25 in an ordered fashion until such time as the slave device 10 has completed the actions necessitated by the receipt of the data from the master for that sequence number of the consecutive sequence numbers and a report of successful completion of the operation has been received by the master device 5. The reporting of the successful completion of the operation is described subsequently.

The system and method operates such that the sequence numbered data retained in the replay buffer 25 retains the consecutive numbering so as to be eventually associated with successful completion of the operation or error reports.

While the consecutive sequence numbers are shown as having been assigned to all of the entries in the master device output FIFO 20 at the time of initial entry into the FIFO, the consecutive sequence numbers may be assigned, for example, at the time that the entry is de-queued from the FIFO and transmitted over the communications channel 8. This may permit the re-ordering of the entries in the output FIFO 20 based on other system needs and criteria so as to alter the priority of transmission. Alternatively a plurality of output buffer 20 may be maintained for various purposes either physically or logically. In such an embodiment, the operation of the output buffer 20 may not be characterized as a FIFO. But, an entry selected for transmission would be assigned the next consecutive sequence number. When the data from the memory 20 is passed to the transmitting interface 30 for transmission to the slave device 10, the data is also stored in the retry buffer 25 along with the consecutive sequence number. A person of skill in the art will appreciate that this is merely a conceptual description of the accounting for the data and that a variety of system programming techniques and hardware arrangements may achieve the same purpose.

To understand the operation of the system and method, the initial description is predicated on the successful completion of all operations. Once this has been explained, the consequences of an error in the communication channel 8 will be described.

Figure 4:
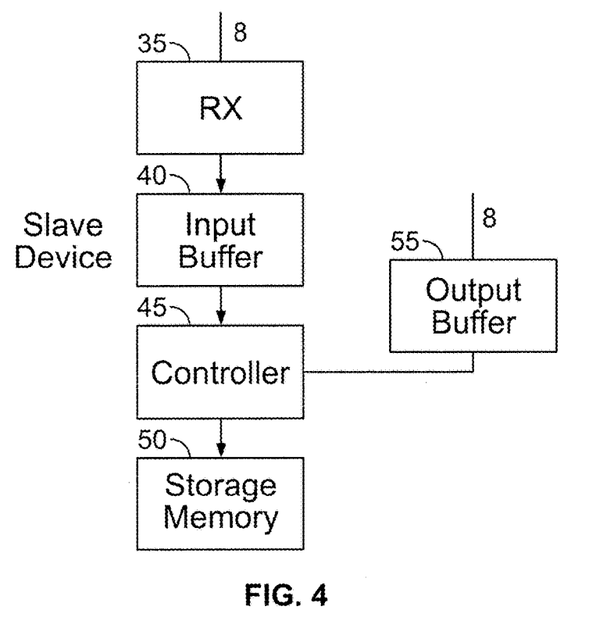
FIG. 4 shows an example of block diagram of a portion of the slave device.

The data transmitted by the master device 5 over the communications channel 8 is received by the slave device 10 as shown in FIG. 4. A receiver interface 35 serves to manage the interface to the communications channel 8, data format conversion, error correction or the like, so as to interface with the remainder of the digital circuits of the slave device 10. Received data is passed to an input buffer 40 where the received data elements are stored in a FIFO. So, the earliest received data is the first data to be acted upon by the controller of the slave device. The controller de-queues the received data, which may be a command, request for status, data to be written, or the like, and processes the data. The relevant consecutive sequence number which was part of the received data is appended to the response (which may be a status report, read or computed data, or the like) and inserted to the output buffer 55, which may ordinarily operate as a FIFO, and the competed request is deleted from the input buffer 40. Where a write operation is performed, the data may be written to a storage memory 50. Where a read operation is performed, for example, the data may be read from the storage memory 50. Alternatively the command or data may be passed to another device over an interface and another communications link.

Figure 5A:
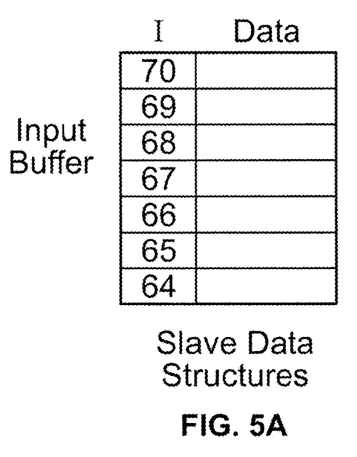
FIG. 5A shows an example data structure maintained in an input buffer of the slave device showing received sequence of data elements.
Figure 5B:
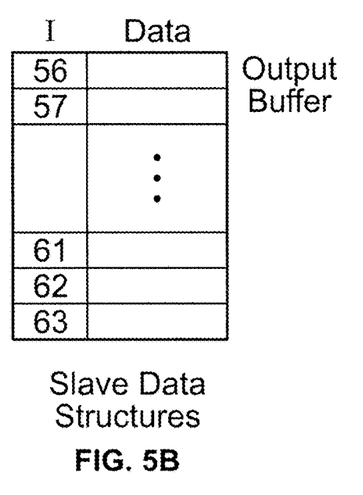
FIG. 5B shows an example data structure maintained in an output buffer of a slave device showing a sequence of data elements to be transmitted to the master device.

The received sequence of data elements in the input buffer 40 is shown in FIG. 5A, and the data in the output buffer 55 is shown in FIG. 5B. Here, the output buffer 55 is shown as being filled with data. In such an event, the further processing of the input buffer data may be suspended until data is de-queued from the output buffer 55 and output buffer space becomes available. If the input buffer 40 is similarly filled, then no further data may be accepted from the master device 5. Depending on the system design, this state may be notified to the master device 5 by an error message, or by a warning message when a buffer is almost full.

Data in the slave device output FIFO 55 is de-queued and transmitted to the master device 5. In an example, the master device 5 may poll the slave device 10 so as to cause the data element at the top of the buffer to be transmitted over the communications link 8. To prevent loss of data due to communications errors, the data transmitted from the slave device 10 the master device 5 is not removed from the top of the queue in the output FIFO 55 until the master device has, in some manner, acknowledged successful receipt of the data from the slave device 10.

Since the communications channel is highly reliable, the number of data elements that are not successfully received is small and the communications channel may be optimized for high speed transmission with minimum handshaking or other protocol overhead. In such cases the data may be continually received by the slave device 10 and stored in the input buffer 40 prior to any consistency check, and the master device 5 acts as if every data transfer has been successful. However, errors inevitably occur, as is known in the communications and computer art. The causes are error are myriad and are here simply treated as some type of error in transferring the data from the master device 5 to the slave device 10.

By the time that a date element has been received by the slave device 10 and checked for transmission errors, a plurality of additional data elements may already be in transit from the master device 5 to the slave device 10. Since the streaming nature of the data and data processing employed presumes that the data that was sequentially transmitted by the master device 5 was sequentially acted upon by the slave device 10 and sequentially returned to the master device 5, any disruption of this orderly flow may lead to data corruption or loss.

Figure 6A:
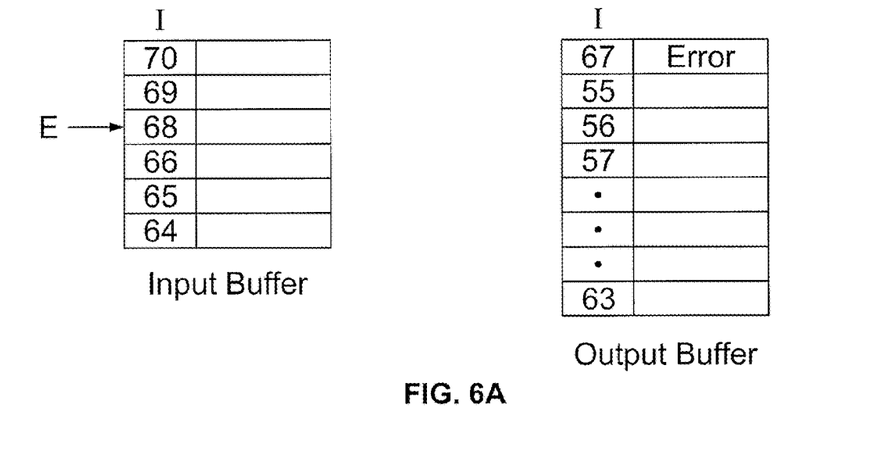
FIG. 6A shows an example of an error detected at the input buffer of the slave device, where the error is a skip in sequence numbers (shown at the arrow) and the insertion of an error message at the top of the queue of the output buffer of the slave device.

The data received by the slave device 10 and stored in the input data buffer 40 is checked to verify that the sequence numbers of the data elements remain a consecutive sequence of numbers. Either a gap in the sequence of numbers, a number out of order, or a repetition of a number is indicative of a data transmission error. FIG. 6A shows an example of a gap in the sequence numbers, where, as an example, sequence number 67 is absent. Consequently data element 66 is the last data element which satisfies the consecutive sequence number requirement.

In an aspect, the recognition of an error, such as a gap in sequence numbers is notified to the master device 5. This may be done by placing an error message at or near the top of the queue in the output buffer 55 as shown in FIG. 6A. When this message is de-queued and received by the master device 5, the master device 5 may act to retransmit all of the data that was transmitted subsequent to the lost data. That is, all of the data in the retry buffer 25 having sequence numbers greater than 66 is transmitted from the retry buffer 25. So, in this example the data having sequence numbers greater than 66 would be retransmitted and the processing continued.

At the slave device, the data elements having sequence numbers greater than 66 are deleted from the input buffer 40, so that no duplicates of the data to be sent from the retry buffer 25 of the master 5 remain in the slave device. In the meanwhile, the slave device 10 may continue to process the data elements in the input buffer 45 up to sequence number 66, which was the last valid sequence number received. Once the retry buffer data has again begun to be successfully received by the slave device 10, the higher sequence numbers may also be processed if they meet the consecutive sequence criteria (in this case starting with 67).

Figure 6B:
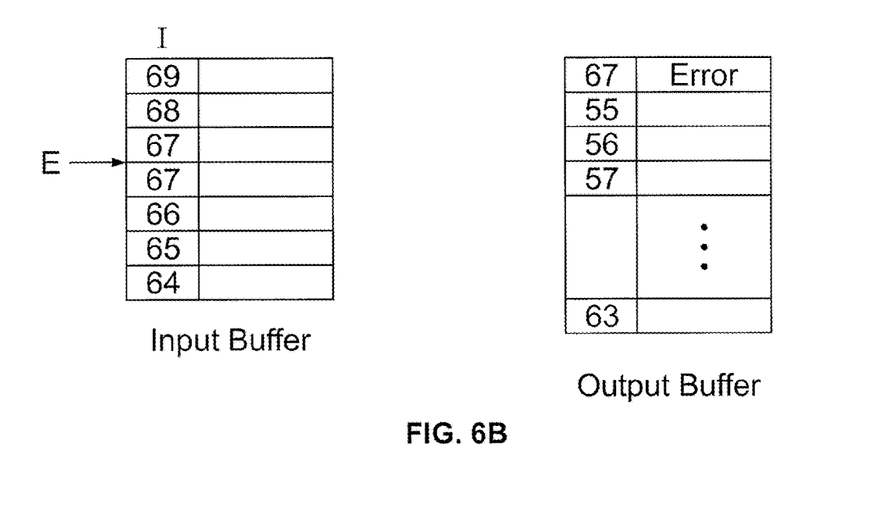
FIG. 6B shows an example of an error detected at the input buffer of the slave device, where the error is a duplication of a sequence number (shown at the arrow); and the insertion of an error message at the top of the queue of the output buffer of the slave device.

Another error type may be receipt of a duplicate data element. As shown in FIG. 6B, this may be represented by two entries having a same sequence number. One might address this error, providing that both of the data elements themselves were error free, by choosing one and discarding the other. However, this does not provide any indication of transmission error to the master device, and my camouflage a developing system problem. So, it may be desirable to respond to a duplicate data problem by reporting that an error has occurred at sequence number 67 and causing the retry buffer 25 to retransmit all of the data transmitted subsequent to sequence number 66. The higher sequence numbers in the input buffer 40 of the slave device may be discarded in preparation for receiving retransmitted data. The earlier received data in the input buffer 40 of the slave device, having lower sequence numbers than that associated with the error condition, may continue to be processed without interruption.

In another aspect, data may be received out of sequence, where the difference in successive received sequence number is different than plus one. This may occur in some transmission systems where the data is routed over a network and congestion may occur. This situation may be detected and rectified in a manner similar to that described above.

The transmission of data from the output buffer 55 of the slave device 10 to the master device 5 may be performed by role reversing the master and slave devices, and providing a replay buffer in the device that was formerly the slave device.

In some designs, it may be preferable to configure the master device 5 to poll the slave device 10. The master device 5 would poll the slave device 10 and the data at the head of the output buffer queue would be transmitted from the slave device 10 to the master device 5. However, discarding the data from the output buffer queue 55 may result in data loss if there is a transmission error between the slave device 10 and the master device 5. So, it may be desirable to retain the data at the head of the queue until the master device 5 has determined that the data has been satisfactorily received. Generally this would be determined by inspecting the sequence numbers, and may take account of an exception to the numbering rule when an error message is encountered.

After determining that the data has been successfully received by the master device 5, the master device 5 may signal the slave device 10 to discard the recently sent data at the head of the queue.

If the slave device 10 has no data in the output queue 55, then no data will be received by the master device 5. This may be considered as the equivalent of data lost in transmission, and the master device 5 may issue another data request, and continue to do so until valid data was received. Alternatively, the slave device 10 may send a data element indicating that there was no data to be transmitted.

After successfully receiving a data element, the master device 5 may signal the slave device 5 that the most recently sent data element may be deleted from the output buffer 55. This may be an alternate version of the poll signal and may be termed a pop. When data is flowing routinely from the slave device 10 to the master device 5, alternating poll and pop commands will be received by the slave device 10. That is, the pop command only results in discarding the last sent data element, but does not result in sending new data. Alternative signaling schemes may be used to manage this process.

Data elements received from the slave device 10 by the master device 5 are processed to determine the disposition of the data elements in the replay buffer 25. Where the data element is a status report, and the status report is the successful completion of an operation command previously sent by the master device 5, the corresponding data element may be present in the replay buffer 25. Since the command has been successfully executed, the data element in the replay buffer 25 corresponding to the sequence number of the status report may be discarded, thus freeing space in the replay buffer and completing the end-to-end continuity check of the master-slave pair.

The various buffers described may be managed as continuous data areas divided by pointers. Data addressing may be direct or through various layers of abstraction to achieve the purposes described above. The selection of algorithmic approach may be determined by, the size of the buffers, the structure of the device memory, speed considerations, flexibility in reordering data for differing priority of service, or the like.

Figure 7:
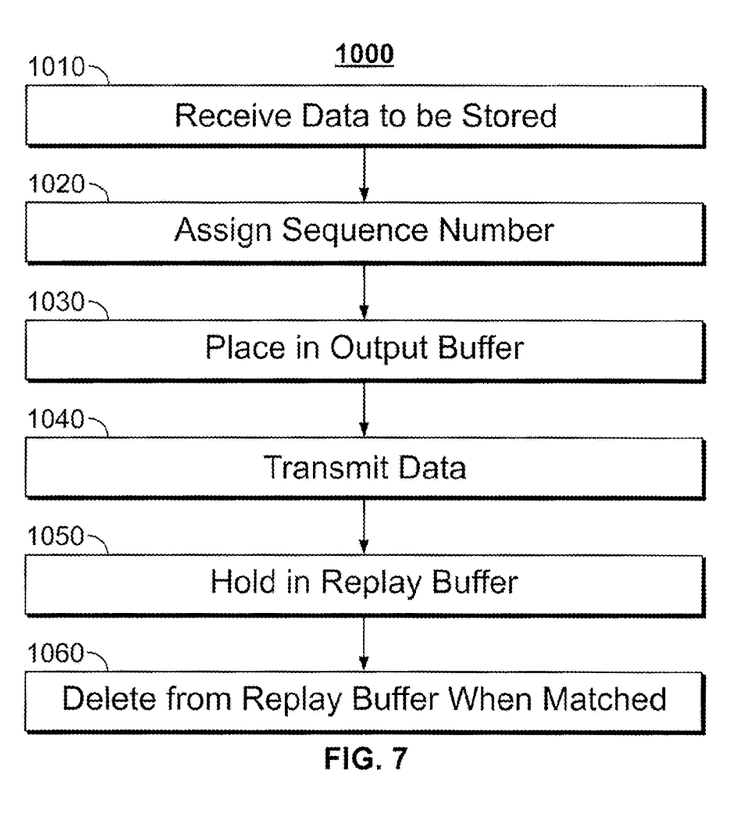
FIG. 7 is block diagram an example of the process of transmitting data from the master device and managing the contents of the replay buffer so as to delete data from the replay buffer when the sequence number has resulted in a completion of the response by the slave device.

A method (1000) of managing a master-slave communications path is described. In an aspect, a master device may receive data to be stored on a slave device, data to be retrieved (read) from a slave device, requests for status, or the like.

Data, commands or other requests are received from another device or system over a communications interface (1010) and are acted upon depending on the nature of the data. Where the incoming information is meant to be transmitted to another device for execution, the information is placed in an output buffer associated with the intended receiving device. For the purposes of this description, the device transmitting the information may be considered to be the master device with respect to the receiving device that will perform the function. The performing device may be considered to the slave device.

Generally, the term data is intended to be broadly read so as to include commands, requests such as status requests, status reports such as successful command execution, error reports, the data to be read or written, or the like. The type of data and the actions associated with the data may be implied by the data itself or by a specific command accompanying the transmission, as would be apparent to a person of skill in the art. Where a specific type of data is mentioned, this is not to imply that such data type is the only data type upon which a specific action could be predicated or performed. Rather, it is a convenient example.

The master device may receive data and commands from an external device and be stored in a memory of the master device. The data may be assigned a sequence number from the consecutive sequence numbers (1020) in order of receipt of the data. Alternatively, the data may be temporarily buffered so that the data may be grouped in a more efficient order for command execution or data transmission. Moreover, other actions may be performed on the commands or data either before or after the assignment of a continuous sequence number Data, explicitly or implicitly addressed to a slave device, may be placed in an output buffer associated with the slave device (1030). In accordance with a selected communications protocol, data may be selected for transmission to the slave device such that the data is sent in order of the continuous sequence number. In an alternative, the consecutive sequence number is assigned to the data immediately prior to transmission.

In addition to being transmitted over a communications link, the transmitted data is stored in a replay buffer (1050). When the completion of the operations associated with a particular data entry has been confirmed by the slave device, the data entry may be deleted from the replay buffer (1060).

Figure 8:
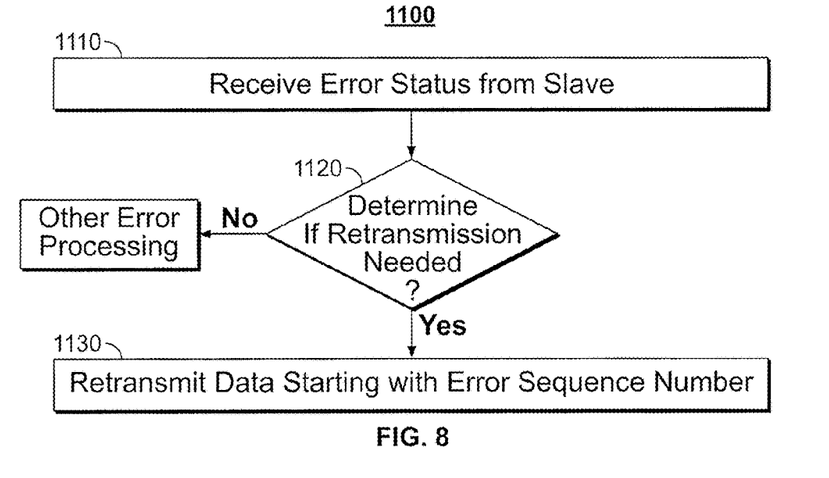
FIG. 8 is a block diagram an example of the process of receiving an error message from the slave device and retransmitting data from the replay buffer for starting with the sequence number of the error.

The purpose of the replay buffer is to store the transmitted data until a confirmation of the completion of a requested operation and the results thereof have been received by the master device. FIG. 8 shows the process when an error message (data) is received from the slave device (1110). The error message is evaluated to determine the action to be taken by the master device (1120). Here we discuss only error messages that result in resending data from the replay buffer. The error message will contain information identifying the last successfully received continuous sequence number, and the replay buffer can then retransmit all of the data in the replay buffer having continuous sequence numbers that are greater than the continuous sequence number at which the error occurred. In an alternative, a single buffer may be maintained, where a pointer to the last sent data element is maintained. When retransmission is required, the data between the last sent pointer and the continuous sequence number of the error is sent in order of increasing continuous sequence numbers. In such a circumstance, the data elements having continuous sequence numbers less than the continuous sequence number of the last confirmed operation performed by the slave device may be discarded from the buffer, since they will have been successfully completed.

Figure 9:
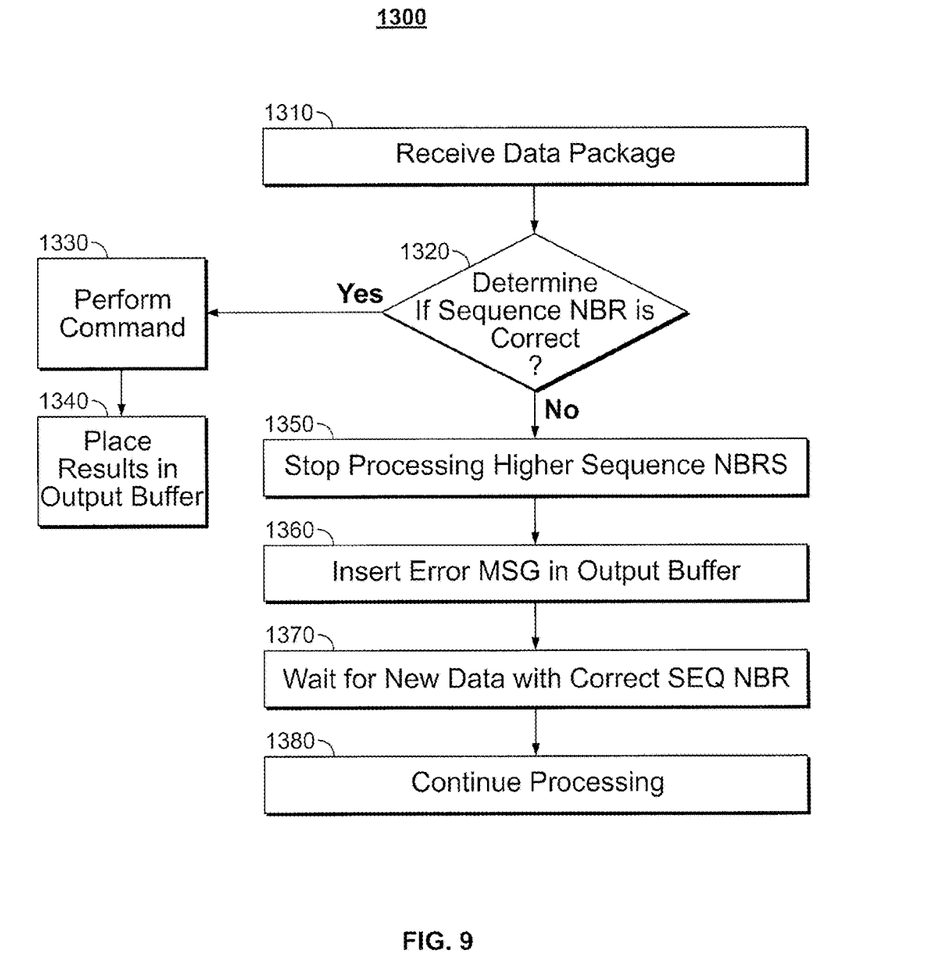
FIG. 9 is a block diagram of an example of evaluating the received sequence of data at the slave device to determine that the data has been received without loss or error and the process of notification of an error to the master device.

At the slave device, as shown in FIG. 9, the data is received over the communications link (1310). As has been mentioned, the communications link may have a minimum handshaking protocol as the data is expected to be received correctly. So, received data may be placed into a buffer and subsequently checked for errors, including continuity of sequence numbers (1320). Where the data is correct, the indicated operation or other disposition of the data is performed by the slave device (1330). Upon completion of the indicated operation, a response data element indicating success for the particular continuous sequence number request is placed in the output buffer, along with any associated data, such as data read from the slave device memory (1340).

In the case where a error has occurred, the processing of data having higher continuous sequence numbers is halted (1350). Data with lower continuous sequence numbers may continue to be processed as the data had already be determined to have been correctly received. A data message may be generated, which may have the same continuous sequence number at which the error has occurred. The data message may also have an indication of the type of error that has occurred. This report of error is placed in the output buffer of the slave device (1360). Data in the input buffer having sequence numbers higher than the sequence number at which the error was identified may be discarded from the input buffer. The error report data may be placed at the top of the queue or near the top of the queue of the output buffer of the slave device, depending on the specific protocol for data transfer between the slave device and the master device.

The process of transferring data from the slave device to the master device, and the process of executing the valid received instructions remaining in the input buffer may continue so long as there is valid data in the input buffer, as both of these actions are based on known valid instructions.

As has been described in connection with FIG. 8, when the master receives an error message from the slave, the master determines the appropriate corrective action. Where the error is that of an error of some type in the transmission of the data, the master transmits all of the data in the replay buffer having continuous sequence numbers between the last transmitted continuous sequence number and the continuous sequence number where the error occurs, in increasing continuous sequence number order.

At the slave device, the retransmitted data is received (1310) and the data is placed in the input buffer in the order that it is received. The retransmitted data starts at the continuous sequence number where an error was reported, and so the data and subsequent data are now correct and in the proper sequential order (1370). So, the processing may now continue with the correct data sequence (1380).

A method of sending data from the slave to the master may be analogous to that described above, where the designations of master device and slave device are interchanged.

Figure 10:
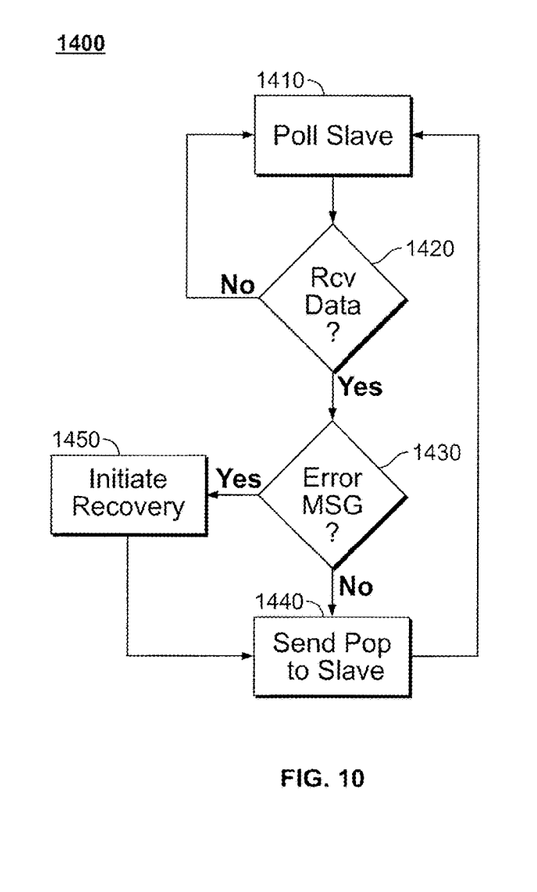
FIG. 10 is a flow diagram of an example process of retrieving data from the output buffer of the slave device by alternating poll and pop requests by the master device.

In another aspect the slave device may be polled by the master device (1410). The master device awaits the receipt of data for a predetermined interval (1420) and if data is not received, the poll step (1410) is repeated until data is received. When data is received, the data is evaluated to determine if there is (a) a data transmission error, (b) the data is an error message, or (c) the data is a valid response to a previously sent continuous sequence number. Where the data is a valid response, the data is dispositioned in accordance with the protocol associated with the request. In the case of error of transmission between the slave device and the master device, the poll is repeated until a valid response is received. Generally this action is rare due to the expected low error rate of the communications channel. Where the data is an error message created by the slave device, the previously described actions to be taken by the master device are initiated (1450).

The data that was received in response to the poll (1420) was retained in the output buffer of the slave device as a precaution against a data transmission error. Now, the master device sends an alternative poll, termed a pop, effectively confirming the successful receipt of the data by the master device.

Figure 11:
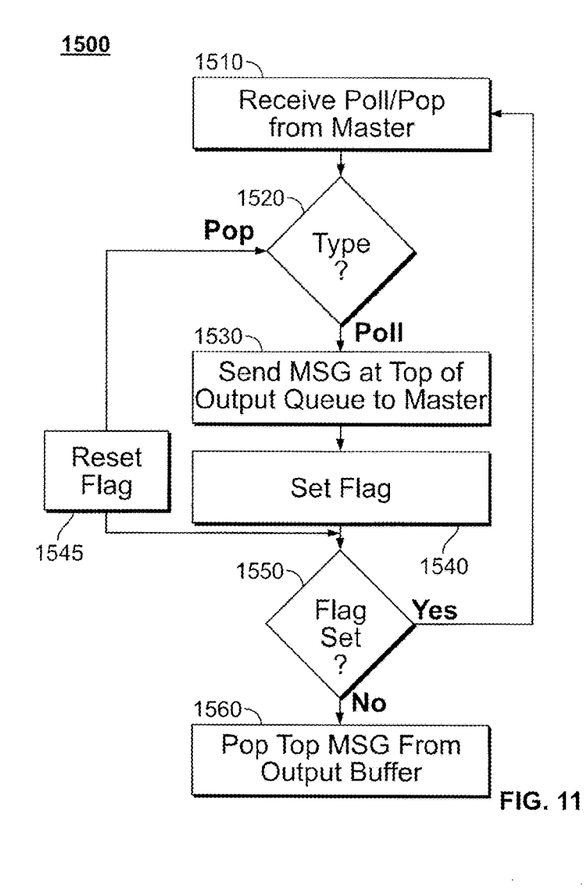
FIG. 11 is a flow diagram of an example of a process used by the slave device to respond to alternating poll and pop requests from the master device.

As shown in FIG. 11, the poll and pop commands are used to manage the output buffer of the slave device. The poll or pop command is received by the slave device (1510), and the type of command determined (1520). If the command is a poll, then the data at the top of the output buffer queue of the slave device is sent to the master device (1530); however, the data is not removed from the buffer. A flag is set (1540) indicating that the data has been sent from the slave to the master, but the receipt of valid data at the master has not been confirmed. A second poll command, received sequentially with the previous poll command, would be processed in the same manner, and the same data would be sent from the slave to the master, as that data remained in the output buffer at the top of the queue. But, when data is transferred successfully, the next sequential command is a pop.

When the data type is determined to be a pop (1520), the flag is reset. (1545). The state of the flag determines the subsequent action. Where the flag is reset, the data at the top of the queue is discarded. The pop command indicated that the data had been successfully received at the master device. The data is no longer needed at the slave device in order to prevent data loss of corruption. Note that if the pop command had failed, the previously sent data would have not have been removed from the top of the queue in the slave output buffer. But, the next command from the master would be s poll and the old data would have been resent. As such, the master would recognize a duplicate has been received and send another pop. Hence the state of the slave output buffer would not change unless the sent data had been successfully received at the master and a subsequent pop command received by the slave and acted upon.

Where a sequence of data elements are being transferred between the slave device and the master device, the poll and pop commands alternate, and data is transmitted in response to the poll command and the contents of the output buffer managed by the pop command. In the circumstance where the output buffer is empty, there is no data to be sent from the slave device to the master device. Either a null response is sent or no response is sent, depending on the protocol. So there may be a series of sequential poll responses until data is present in the output buffer of the slave device such that data can be transmitted in response to the poll. This would initiate an alternating sequence of poll and pop commands until the output buffer is again empty.

Figure 12:
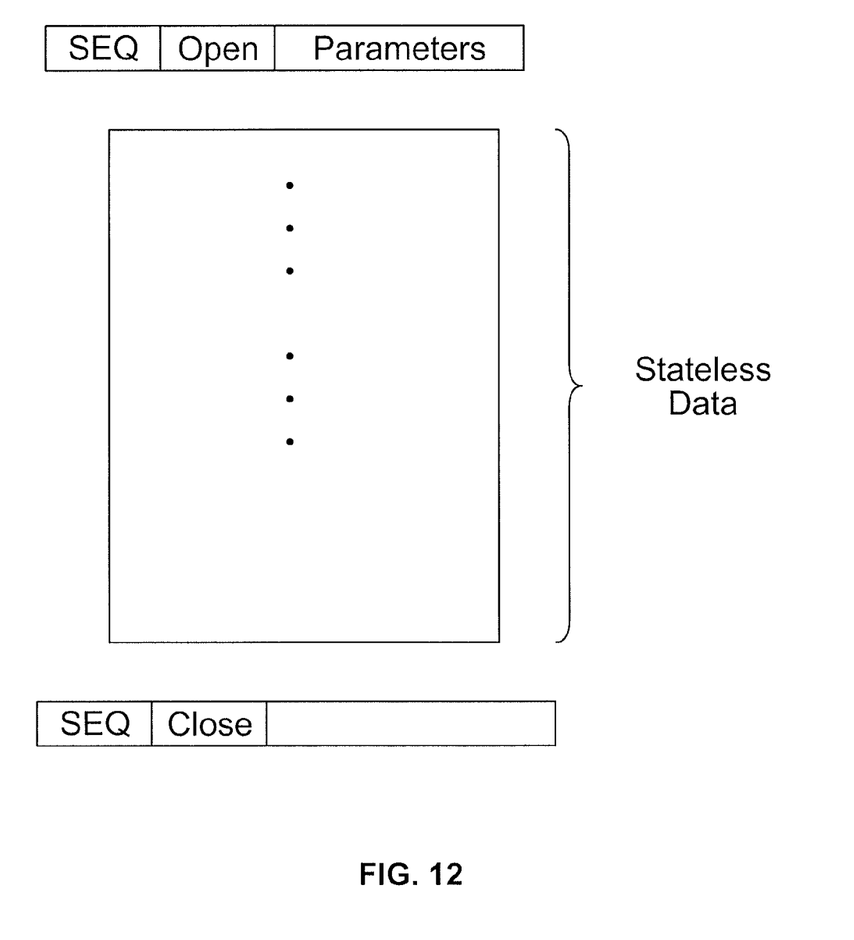
FIG. 12 is an example of encapsulating a plurality of blocks of data without sequence numbers between two data blocks having sequence numbers.

In another aspect, blocks of data that are not identified by continuous sequence numbers may be encapsulated between pairs of commands transmitted between the two devices which are identified by continuous sequence numbers. For example, a write data command may precede a block of data transmitted from the master device to the slave device to be stored. The block of data may be one or more pages of data or portions of pages. The write data command may be parameterized such that the amount of data that is to be stored, the storage addresses (e.g., LBA) and the like may be transmitted. The start of such an operation may be termed an "Open" command. The parameters of the Open command may describe the amount and structure of the data being transmitted sufficiently well that the end of the block of data to be stored may be implicitly defined. However, a "Close" command may explicitly define the extent of the data to be stored that is being transmitted. The data itself may be stateless have no sequence number. But the successful transmission of the data block may be ascertained from the Open and Close commands and the amount of data successfully received. Alternatively, each data element (e.g., a page) may be assigned a number from the continuous sequence numbers.

A similar approach may be used for read operations. In this case, the Open and Close commands may not encapsulate any data when transmitted between the master device and the slave device, but will encapsulate data when the results of the read operation are transmitted from the output buffer of the slave device. In the example given, the poll/pop sequence may result in each command and each data element being separately transmitted and implicitly acknowledged, so that the sequence numbers or number of data blocks intervening between the Open and Close read commands may be inferred. A person of skill in the art would understand that a variety of data management protocols may be used depending on the expected error rate of the communications channel between the slave and the master.

Although the steps in the method have been described as being performed in a particular order, this is not intended to be a limitation. A person of skill in the art would appreciate that the steps may be reordered, that some of the steps may be omitted or combined, and that additional processing steps may be included, depending upon the detailed design.

Although the present invention has been explained by way of the examples described above, it should be understood to the ordinary skilled person in the art that the invention is not limited to the examples, but rather that various changes or modifications thereof are possible. The scope of the invention is comprised of the claims.

What is claimed is:

1. A system for transmitting data, comprising:
a master device having a processor, further comprising:
a controller;
a memory having an output buffer and a replay buffer; and
a data transmission and a data reception interface, wherein the controller is configured to:
repeatedly assign sequential sequence numbers to data packets and transmit the data packets to a slave device without receiving receipt acknowledgments from the slave device, wherein at least some of the data packets include memory access requests;
store the data packets transmitted to the slave device in the replay buffer;
receive data packets back from the slave device including results of the memory access requests and having the sequence numbers previously assigned to the data packets by the master device;
delete the data packets from the replay buffer having the sequence numbers of the data packets received from the slave device;
receive one of the data packets including an error indication and including one of the sequence numbers; and
retransmit all data packets in the replay buffer having sequence numbers equal to or greater than the sequence number for the received one of the data packets including the error indication.

2. The system of claim 1, wherein a first data packet of the data packets precedes a predetermined sequence of data packets without sequence numbers and a second data packet having another sequence number follows the predetermined sequence of data packets without the sequence number.

3. The system of claim 1, wherein a first poll command is sent to the slave device to retrieve data from the slave device.

4. The system of claim 3, wherein a second poll command is sent to the slave device when data is successfully received from the slave device.

5. The system of claim 1, wherein the output buffer is a FIFO buffer.

6. The system of claim 1, wherein the replay buffer area is a FIFO buffer.

7. A system including a slave device comprising:
a slave controller;
a memory having an input buffer and an output buffer; and
a data transmission and a data reception interface,
wherein the slave controller is configured to:
receive data packets from a master device that include sequentially assigned sequence numbers and memory access requests;
store the data packets in an input buffer and execute the memory access requests without sending receipt acknowledgments of the data packets to the master device;
store data packets including results of the memory access requests in the output buffer, the data packets in the output buffer including the sequence numbers of the data packets received from the master device associated with the same memory access requests;
transmit the data packets in the output buffer including the results of the memory access requests to the master device to acknowledge receipt of the data packets received from the master device;
notify the master device when an identified one of the data packets in the input buffer does not have a continuous sequential sequence number with the sequence numbers of the other data packets in the input buffer; and,
delete the data packets from the input buffer having sequence numbers equal to or higher than the sequence number for the identified one of the data packets.

8. The system of claim 7, further configured to:
notify the master device by placing a notification packet in the output buffer with the sequence number of the identified one of the data packets.

9. The system of claim 8, wherein the slave controller is further configured to execute the memory access requests for the data packets with sequence number less than the sequence number for the identified one of the data packets while receiving replacement data packets for the deleted data packets from the master device.

10. The system of claim 7, wherein a first data packet precedes a predetermined sequence of data without sequence numbers and a second data packet follows the predetermined sequence, the slave controller is configured to process the predetermined sequence of data without sequence numbers and to perform a requested operation on the sequence of data without sequence numbers in the output buffer with the sequence number of the first data packet preceding the data without sequence numbers and the second sequence number following the following the results of the requested operation.

11. The system of claim 7, wherein the slave device is configured to:
  receive a first poll command and, responsive to the first poll command, dequeue data from the output buffer in FIFO order while retaining the data in the output buffer; and
  receive a second poll command and, responsive to the second poll command, delete the dequeued data from the output buffer.

* * * * *